United States Patent
Burke, Jr.

[15] 3,691,129
[45] Sept. 12, 1972

[54] ELASTOMER-SILICA PIGMENT MASTERBATCHES AND PRODUCTION PROCESSES RELATING THERETO

[72] Inventor: Oliver W. Burke, Jr., 1510 S.W., 13th Court, PomPano Beach, Fla. 33061

[22] Filed: July 16, 1970

[21] Appl. No.: 55,455

Related U.S. Application Data

[60] Continuation-in-part of Ser. No. 798,215, Sept. 16, 1968, which is a division of Ser. No. 611,250, Jan. 24, 1967, which is a continuation-in-part of Ser. Nos. 458,420, May 24, 1965, and Ser. No. 458,379, May 24, 1965, and Ser. No. 479,806, Aug. 16, 1965.

[52] U.S. Cl....260/33.6 AO, 206/308 N, 260/41.5 R, 260/41.5 A, 260/41.5 MP
[51] Int. Cl...........................C08c 11/10, C08k 1/08
[58] Field of Search..260/33.6 AO, 41.5 A, 41.5 PM; 106/308 N

[56] References Cited

UNITED STATES PATENTS

| | | | |
|---|---|---|---|
| 2,663,650 | 12/1953 | Iler | 106/308 |
| 2,821,232 | 1/1958 | Wolf | 152/330 |
| 3,014,810 | 12/1961 | Dybalski et al. | 106/308 |
| 3,081,276 | 3/1963 | Snyder et al. | 260/33.6 |
| 3,172,726 | 3/1965 | Burke et al. | 23/182 |
| 3,244,660 | 4/1966 | Herold | 260/29.7 |
| 3,250,594 | 5/1966 | Burke et al. | 23/182 |

Primary Examiner—Lewis T. Jacobs
Assistant Examiner—J. H. Derrington
Attorney—Hall & Houghton

[57] ABSTRACT

Curbing of silica pigment losses and the promotion of uniformity of product in the preparation of an elastomer-silica pigment masterbatch are effected (a) by combining (1) an aqueous slurry of hydrated silica pigment precipitate which has a bound alkali content, which has been prepared by precipitation from an aqueous alkali metal silicate solution, and which has been continuously maintained in an aqueous phase without having been dried after its precipitation, with (2) a quantity of oleophilic amine material, (3) combining the resulting treated silica pigment slurry with a solvent dispersion of the elastomer, with or without (4) carbon black and/or processing oil and (5) selected reactant, and (b) removing the solvent and aqueous phase and recovering the resulting combination as a masterbatch essentially without loss of silica pigment.

6 Claims, 1 Drawing Figure

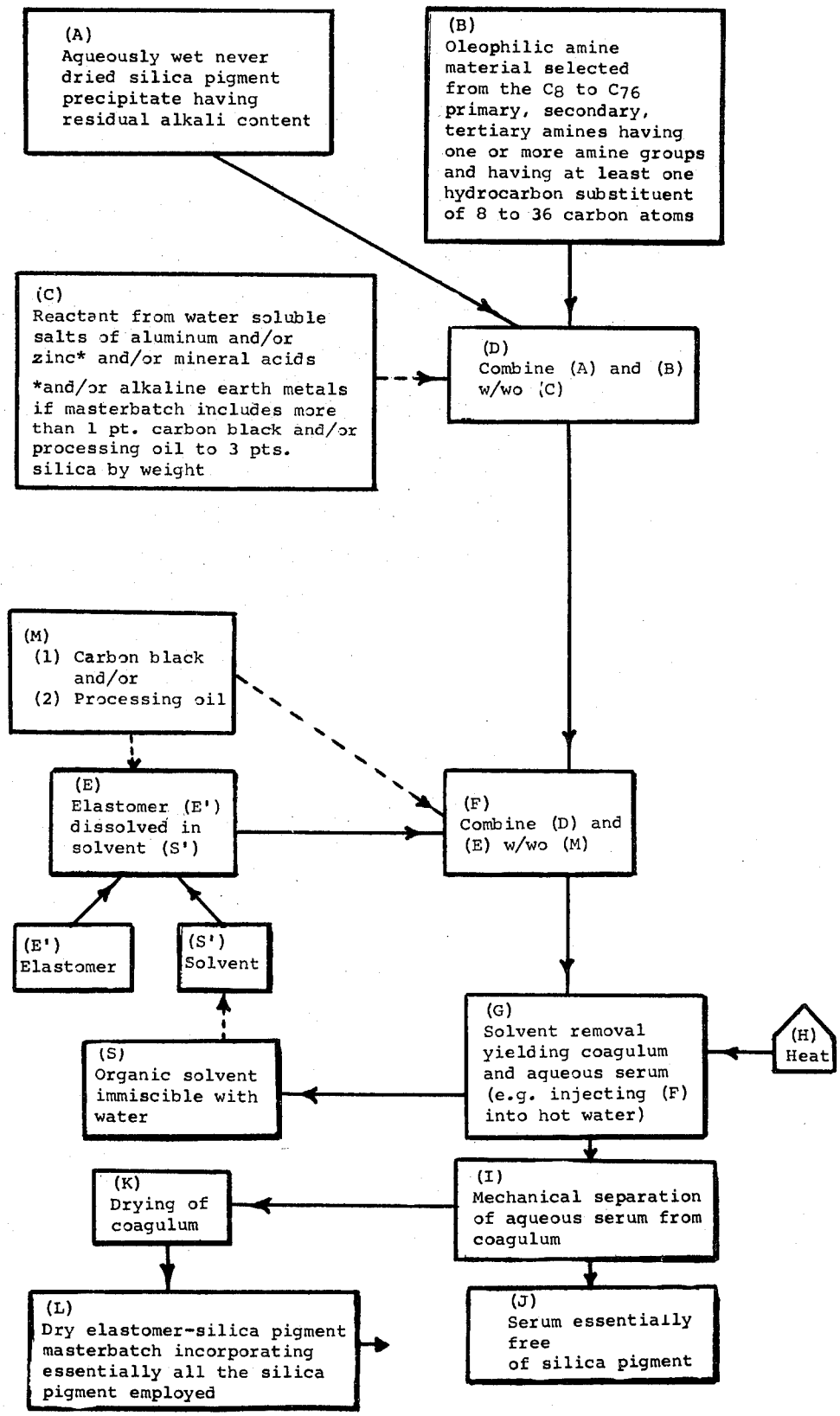

ELASTOMER-SILICA PIGMENT MASTERBATCHES AND PRODUCTION PROCESSES RELATING THERETO

CROSS-REFERENCE TO RELATED APPLICATIONS

This application is a continuation-in-part of co-pending application Ser. No. 798,215, filed Sept. 16, 1968 as a division of application Ser. No. 611,250, filed Jan. 24, 1967 (Case 48DM) said application Ser. No. 611,250 having been a continuation-in-part of earlier applications Ser. No. 458,420, filed May 24, 1965 (Case 48D); Ser. No. 458,379, filed May 24, 1965 (Case 48C); and Ser. No. 479,806, filed Aug. 16, 1965 (Case 48E), the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

FIELD OF THE INVENTION

The field to which this invention pertains is the preparation of masterbatches from solvent dispersions of elastomers and aqueous slurries of precipitated silica pigments.

BRIEF DESCRIPTION OF THE DRAWING

The single FIGURE of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e., the formation of silica gel)—and to promote the precipitation of a silica pigment in finely divided form (i.e., in particles in the reinforcing size range of about 0.015 to about 0.150 microns, preferably 0.02 to 0.06 microns) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10 percent by weight as $Na_2O$, and upon being dried in this state form aggregates, from the pigment particles of reinforcing size, which aggregates are of much greater than reinforcing size and will not adequately disperse (i.e., break down into particles of reinforcing size) when incorporated into rubber either by dry compounding or latex compounding.

When one treats such alkaline wet silica pigments with water soluble salts of alkaline earth metals, e.g., calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g., avoiding loss of pigment in the serum in wet masterbatching) and adequate dispersion of the pigment in the elastomer in particles of reinforcing size (e.g., minimizing the pigment aggregation problem); and the present invention provides a process for accomplishing these ends by forming the masterbatch from aqueously wet hydrated silica pigment precipitates having a bound alkali content of 0.1 to 10 percent by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus, the present invention, inter alia, provides a simple and efficient process for the curbing of silica pigment losses and the promotion of uniformity of product in the preparation of masterbatches of measured silica pigment content. As shown in the drawing, the process comprises the steps of:

A. providing an aqueous slurry containing 5 to 75 parts by weight, dry basis, of hydrated silica pigment precipitate which has a bound alkali content in the range of 0.1 to 10 percent by weight as $Na_2O$; which has been prepared by precipitation from an aqueous solution of alkali-metal silicate with the aid of carbon dioxide, and which has continuously been maintained in an aqueous phase without having been dried after its precipitation;

B. providing a quantity of from 0.1 to 20 percent by weight, based on the silica pigment referred to in step (d), of oleophilic amine material, e.g., from the class consisting of the amine compounds having at least one amine group which has attached thereto a chain of at least eight carbon atoms imparting oleophilic properties to the compound;

C. providing, when used in step (D), reactant material selected from the class consisting of the members of the following groups: Group (I) the water soluble salts of aluminum or zinc; Group II the water soluble salts of alkaline earth metals; Group (III) the mineral acids; and Group (IV) combinations of any two or more of such members;

D. combining the wet silica pigment provided by step (A) with reactant material provided by step (C) in an amount in the range of from 0 to at least a stoichiometric equivalent, based on the alkalinity of the said pigment;

E. providing an organic solvent dispersion of the elastomer containing (1) 100 parts of an elastomer by weight, and (2) the solvent of which is essentially water immiscible;

F. then intimately mixing the solvent dispersion of elastomer provided by step (E), with (1) the treated silica pigment slurry prepared by step (D), (2) from 0 to 75 parts by weight of carbon black and (3) from 0 to 45 parts by weight of processing oil, with the limitations that the total of silica pigment and carbon black, dry basis, not exceed 80 parts by weight and that the total of carbon black and processing oil, by weight, be at least 5 percent of the weight of silica pigment, dry basis, when the reactant employed is selected essentially from Group (II); and G. to K. separating the volatiles from the resulting masterbatch.

The elastomer (E) is dissolved in solvent (S')—which may be recycled solvent (S)—and said solvent itself, or as an azeotrope with water, preferably has a boiling point lower than that of water at atmospheric pressure, and the viscosity of the elastomer-solvent dispersion (i.e., solution) preferably should lie in the range of 5,000 to 50,000 centipoises, as this viscosity facilitates the intimate mixing of the elastomer-solvent solution and the slurry of silica pigment treated with amine surfactant.

The silica-elastomer masterbatch is recovered from the intimately mixed solvent dispersion of elastomer (E) and oleophilic wet silica pigment. Such recovery is effected by separating the volatiles from the coagulum, preferably in two steps (G) and (I), when the solvent or its aqueous azeotrope can be volatilized in step (G) prior to separation of the solids from the remaining aqueous phase in step (I). The volatilizing of the solvent, step (G) to convert the mixture (F) to coagulum and aqueous serum may be effected by running the dispersion (F) into hot water. The greater part of the separation of the coagulum from the aqueous serum in step (I) is preferably effected by mechanical dewatering, e.g., filtration, decanting, centrifuging, etc., to reduce the heat requirement for final drying of the masterbatch. The serum removed by mechanical dewatering is found to be essentially free of silica pigment as indicated at (J) in the drawing and the dry elastomer-silica pigment masterbatch thus incorporates essentially all of the silica pigment employed. The process thus curbs silica losses and assures a uniform silica pigment content in the masterbatch.

DESCRIPTION OF PREFERRED EMBODIMENTS

Preferred embodiments illustrative, but not restrictive, of the invention are set forth in Examples 1 through 28. In these examples the hydrated silica pigment precipitate has a bound alkali content in the range of 0.1 to 10 percent by weight $Na_2O$ and has been prepared by precipitation from an aqueous solution of alkali metal silicate with the aid of carbon dioxide and said silica precipitate has been continuously maintained in the aqueous phase without having been dried after its precipitation, and the aqueous silica pigment is combined with various oleophilic amines and from 0 to at least a stoichiometric equivalent, based on the alkalinity of the silica pigment slurry, of reagent selected from the class consisting of the members of Group (I) the water soluble salts of aluminum or zinc, Group (II) the water soluble salts of alkaline earth metals, Group (III) the mineral acids and Group (IV) combinations of any two or more of such members.

In these examples the reactants employed were: in Examples 1, 6, 9 and 24, aluminum sulfate; in Examples 2 and 26, zinc sulfate; in Examples 3, 7, 8, 20–23, and 28, sulfuric acid; in Example 9; aluminum sulfate and sulfuric acid; in Example 13, alum; in Examples 5, 10, 11, 12, 25 and 27, alkaline earth metal salts; and in Examples 4, and 14–19, no reactant.

In these examples, the combination of elastomer-solvent dispersion and oleophilic amine treated silica pigment was prepared by intimate mixing in the high speed, high shear Waring Blender. The removal of solvent from the intimate mixture of the treated aqueous silica and the rubber-cement was accomplished by injecting the said mixture into boiling water and the volatile solvent readily boiled off leaving a wet coagulum or wet crumb in the aqueous serum, which serum was free of silica or essentially free of silica.

The elastomers employed in solution in the present invention include, but are not limited to, those prepared in anhydrous solvent systems, e.g., with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention.

In selecting the solvent the more highly volatile hydrocarbon, or halohydrocarbon, or halocarbon solvents are desirable, e.g.: butane, pentane, hexane, cyclohexane, methylene chloride, carbon tetrachloride, and the like.

This invention may be employed to improve wet silica-polymer solution masterbatching and masterbatches, using the contents of any alkaline slurry of never dried wet silica pigment containing bound alkali with oleophilic amine material in accordance with this invention, and is applicable to the formation of masterbatches therewith with elastomer-organic solvent dispersions, i.e., cements, of all solvent soluble elastomers, including not only hydrocarbon rubbers but also elastomers which are interpolymers, i.e., graft polymers, copolymers or block polymers of monomers having at least one ethylenically unsaturated bond and polymerizable therethrough. The solvent cements, dispersions, or solutions employable herein thus include, but are not limited to, the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g., butadiene-styrene, butadiene-acrylonitrile or methacrylonitrile, butadiene-acrylate or methacrylate ester; and rubbery copolymers of hydrocarbon monomers with polar vinylidene (including vinyl) monomers interpolymerizable therewith, elastomers from olefins and/or cyclic olefins and/or cyclic diolefins and/or dicyclic diolefins including the ethylene-propylene copolymers, the ethylene-propylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils, herein referred to as oil-rubber-silica masterbatches, and any of the foregoing further including other cooperating ingredients, such as carbon black, providing the silica pigment comprises an essential component thereof, e.g., carbon black-elastomer-silica masterbatch.

Examples of the oleophilic amine materials suitable for practicing the invention include those amine compounds having at least one hydrocarbon substituent which contains from eight to 36 carbon atoms and which may comprise groups of straight chain, branched chain, cyclic and/or aryl configuration, of which the following categories are illustrated:

1. long-chain primary amines represented by the formula $R-NH_2$ in which R contains from eight to 36 carbon atoms and includes but is not limited to octyl amine, decyl amine, dodecyl amine, tetradecyl amine, hexadecyl amine, octadecyl amine, palmitoleyl amine, oleyl amine, linoleyl amine, linolenyl amine, the mixed primary amines derived from fatty oils such as coco amine, soybean amine, tallow amine, rosin amine, and partially or completely hydrogenated amines derived from the above unsaturated amines, and the like;

2. long-chain secondary amines having at lease a single alkyl substituent containing from eight to 36 carbon atoms e.g., long-chain secondary amines represented by the formula

in which R contains from eight to 36 carbon atoms and R' contains from one to 36 carbon atoms, and includes but is not limited to dioctyl amine, didecyl amine, didodecyl amine, ditetradecyl amine, dihexadecyl amine, dioctadecyl amine, dipalmitoleyl amine, dioleyl amine, dilinoleyl amine, dilinolenyl amine, the mixed secondary amines derived from fatty oils such as dicoco amine, disoybean amine, ditallow amine, hydrogenated ditallow amine, N-methyloctylamine, N-methyldodecylamine, N-methylhexadecylamine, N-ethyloctylamine, N-ethyloctadecylamine, N-propyldodecylamine, N-butyloctylamine, and the like.

3. long-chain tertiary amines having at least a single alkyl substituent containing from eight to 36 carbon atoms, e.g., (a) long chain tertiary amines represented by the formula

in which R contains eight to 36 carbon atoms, R' contains one to 36 carbon atoms and R'' contains one to 36 carbon atoms and includes but is not limited to trioctyl amine, tridodecyl amine, tristearyl amine, octyldimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and (b) long chain cyclic tertiary amines including but not limited to N-coco morpholine, N-soya morpholine, N-tallow morpholine and the like.

4. long-chain diamines and polyamines having at least a single alkyl substituent containing from eight to 36 carbon atoms including, but not limited to, the diamines represented by the formula $RNH(CH_2)_xH_2$ in which R contains eight to 36 carbon atoms and $x$ is an integer from 1 to 18, as for example N-coco-trimethylene diamine, N-soya trimethylene diamine, N-tallow trimethylene diamine, N-oleyl trimethylene diamine, N-octyl dimethylene diamine, N-octyl tetramethylene diamine, and the above diamines with one or more amine hydrogens replaced by a methyl, ethyl, propyl or butyl group, and the like.

5. long-chain polyethoxylated and polypropoxylated secondary and tertiary amines containing at least a single alkyl substituent having from eight to 36 carbon atoms e.g., the polyalkoxylated amines represented by the formulas

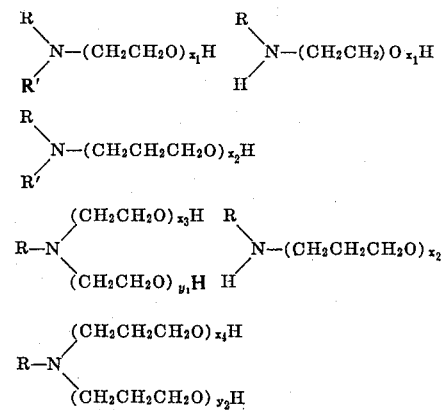

in which R contains eight to 36 carbon atoms and R' contains one to 36 carbon atoms and $x_1$, $x_2$, $x_3$, $x_4$, $y_1$, $y_2$ are each integers between 1 and 30, and include but are not limited to coco amine, soybean amine, tallow amine, and stearyl amine each reacted with a plurality, e.g., 2, 5, 10 or 15, moles of ethylene oxide or propylene oxide per mole of amine; and the like;

6. long-chain polyethoxylated and polypropoxylated diamines having at least a single alkyl substituent having from eight to 36 carbon atoms e.g., the diamines represented by the formulas

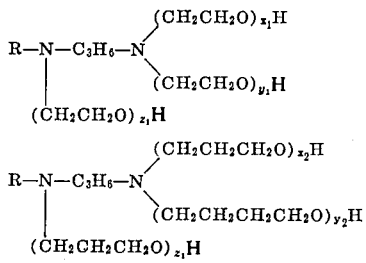

in which R contains eight to 36 carbon atoms and $x_1$, $x_2$, $y_1$, $y_2$, $z_1$ and $z_2$ are each integers between 1 and 30, which include, but are not limited to, the reaction products of N-coco trimethylene diamine, N-soya trimethylene diamine and N-tallow trimethylene diamine each with a plurality, e.g., 3, 10 or 20 moles of ethylene oxide or propylene oxide per mole of amine, and the like.

It is understood that the oleophilic amine materials do not include quaternary ammonium compounds or quaternary ammonium amine compounds as the combination of such quaternary ammonium materials with silica pigments and masterbatches thereof are included in a copending U.S. patent application filed concurrently herewith.

The oleophilic amine materials are for the most part only slightly water soluble compounds and are applied to the aqueous silica slurry in an easily removable solvent for the amine, such as isopropanol, or as an aqueous solution in the form of a water soluble salt of the amine prepared with the aid of mineral acid, e.g., as an amine sulfuric acid or hydrochloric acid salt, or the like. Alternatively the mineral acid may be first combined with the silica and then the free amine may be added. In certain instances the amine may be combined with the aqueous silica slurry without the aid of solvent or acid by mechanical working, as in a high shear mixer, and usually the polyalkoxylated amines are water soluble.

Carbon Black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g., Philblack 0 (TM), Statex K (TM), Statex 160 (TM), Kosmobile 77 (TM), Thermax (TM), and the like.

Processing Oils

The term "processing oils" as used herein is meant rubber processing material of both liquid and solid types (if required the solids types can be converted to the liquid state for use herein with the aid of solvent or plasticizer) and include the processing materials set forth under "Plasticers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g., Bardol (TM), Bardol B (TM); (b) the asphalts, e.g. BRH 2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -722, -757, - 787 (TM), and Califlux TT (TM) and other oils suitable for rubber compounding or the oil extension of synthetic rubber; (d) the coumarone-indene oils and resins, e.g., Cumar Resin RH, -P10, -T (TM); (e) the liquid ester type plasticizers, e.g., dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g., Durez 12687, 12707 (TM) and the like; (g) the hydrocarbon resins, e.g., Neville-LX 782, -LX 125, (TM), Para-Flux, Para Resin 2457 (TM); (h) the hydrocarbon resin-coumarone indene polymers, e.g., Picco Resins (TM); (i) the pine tars and par tar oils, rosin and rosin oils, and tall oil and its derivatives, e.g., PT-101, PT-401, PT-800 (TM); and the like.

EXAMPLES

The following examples will serve to illustrate the invention in more detail:

Silica Preparation

The aqueous slurry of never dried alkaline silica pigment employed in all the examples was prepared in a manner similar to Example 9 of U.S. Pat. No. 3,250,594 except that the ratio of 41° Bé commercial sodium silicate ($Na_2O/SiO_2$)$_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2 percent and the filter cake had a solids of approximately 10 percent by weight. The resulting aqueous silica slurry was designated wet alkaline silica pigment-I, and had a bound and residual alkali content of about 1.5 percent by weight as $Na_2O$, and a serum pH of about 8.5.

A portion of this alkaline silica slurry was acidified to a pH of 4.5 with dilute sulfuric acid and as a filter cake, with washing to a pH of about 7, had a solids of approximately 10 percent by weight. The resulting aqueous silica slurry was designated wet silica pigment-II.

The just described filter cakes having a solids content of about 10 percent by weight are embraced within the term "wet silica pigment" (which herein connotes aqueously wet silica pigment) as are wet pigments of more reduced water content which can be prepared by pressing the said filter cakes, or of augmented water content, e.g., slurries having less than 10 percent solids content, and the terms "aqueously wet silica pigment" or "aqueously wet state," as employed herein are generic to all such conditions. Thus these terms as employed herein embrace aqueously wet silica pigment materials having a solids content in the range of about 1 percent to about 65 percent solids, dry basis, by weight; however, for economy in the practice of the invention wet silica pigments of reduced water content (solids content 8 to 36 percent) are preferred.

To determine pigment quality a portion of wet silica pigment-II was dried at 105° C., micropulverized and compounded as set forth in Table I hereof.

TABLE I

| Compound ingredients: | Quantities (pts. by wt.) |
|---|---|
| Butadiene-styrene copolymer[1] | 100 |
| Silica pigment-I dried | 60 |
| Antioxidant, 2,2'-methylene-bis (4-methyl-6-t.-butylphenol) | 2.0 |
| Magnesium oxide | 4.0 |
| Paracoumarone-indene resin[2] | 10.0 |
| Zinc oxide | 1.0 |
| N-tert.-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

This compound was aged over-night, re-milled and cured for 45 minutes at 287° F.

The physical test data for the respective vulcanizate containing the foregoing silica pigment example is set forth in Table II hereof.

TABLE II

| Silica tested (in vulcanizate) | Harness (Shore A) | Tensile (psi) | Modulus (300%) | Elong. (%) |
|---|---|---|---|---|
| Silica Pigment-II | 72 | 3530 | 1140 | 575 |

In Examples 1–3; 5–13 the alkaline silica slurry is mixed with sufficient water soluble aluminum salt, zinc salt, alkaline earth metal salt and/or acid to react with substantially all of the bound and free alkali and thus reduce the aqueous silica slurry pH to 7.0 or lower. In Examples 4, 14–19 the alkaline aqueous silica slurry is treated with the oleophilic amine material in amounts in the range of 0.1 to 20 percent by weight based on the silica pigment or, for certain additional effects, in the range of 2 to 20 percent of the oleophilic amine based on the silica pigment. The wet silica pigment has never been dried after being precipitated and when employed as a fluid aqueous silica slurry complexes with the silica and the fluid slurry thickness. Preferably used is a precipitated silica filter cake, with or without fluidizing by high shear working, for treatment with the oleophilic amine material. This minimizes the water to be homogenized into the elastomer-solvent cement. Combining of the amine treated silica slurry and the elastomer cement is carried out in a high speed, high shear mixer. The solvent is readily removed by injecting the homogenized mix into hot or boiling water. To facilitate recovery, solvents are employed which are immiscible with water and which themselves, or as their azeotropes, boil lower than water at atmospheric pressure or at higher or lower pressures if it is desirable to employ such.

The solvents employed in the examples are typical of the $C_4$ to $C_8$ hydrocarbon solvents, e.g., hexane, benzene and toluene, and of the $C_1$ to $C_4$ halocarbon and halohydrocarbon solvents, e.g., methylenechloride, and other members of such groups and mixtures thereof may be selected which are suitable for dissolving the elastomers concerned, e.g., butane, pentane, cyclohexane, heptane, octane, xylene, carbon tetrachloride, trichloroethylene, and oxygenated solvents immiscible with water.

The processes of the examples are adaptable for either continuous or batch production of the masterbatch. In those instances in which an oil-rubber-silica pigment masterbatch is desired, up to about 45 percent of oil based on the elastomer is added to the elastomer-solvent cement, preferably with a small amount of emulsifier and/or ammonia to aid dispersion of the oil and the elastomer cement and it will thus be understood that the masterbatch and elastomer dispersion contemplated by the invention may contain a minor proportion of oil. Similarly in Examples 1, and 9, any soluble aluminum salt may be substituted for the hydrated aluminum sulfate, e.g., aluminum ammonium sulfate or aluminum sodium sulfate, and the coagulant solution contemplated by the invention may thus comprise minor amounts of ammonium and/or alkali metal salts without detriment to the process. Furthermore the elastomer cement and/or the aqueous dispersion of silica pigment and/or the aqueous reactant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1–28 the ingredients (A), (B), (C) etc. are listed in the order of their addition except where otherwise specifically set forth. The masterbatches are conveniently prepared at room temperatures, however, elevated temperatures may be employed as to accelerate the masterbatch formation.

TABLE III

Silica-Polymer Masterbatch (Parts by wt.)

| Example | 1 | 2 | 3 | 4 | 5 |
|---|---|---|---|---|---|
| (A) Silica Pigment Slurry-Treated Oleophilic Amine Material | | | | | |
| (a) Silica Pigment Slurry Alkaline silica pigment-I (pH 8.5–9.5) | 150 | 150 | 150 | 150 | 150 |
| Dry solids basis | 15 | 15 | 15 | 15 | 15 |
| Water | 50 | 50 | 50 | 50 | 50 |
| (b) Reagent Aqueous Solution 2% Aluminum sulfate(1) | 55 | — | — | — | — |

TABLE IV

Silica-Polymer Masterbatch (Parts by wt.)

| Example | | | 6 | 7 | 8 | 9 |
|---|---|---|---|---|---|---|
| (A) Silica Pigment Slurry-Treated Oleophilic Amine Material | | | | | | |
| | (a) | Silica Pigment Slurry Alkaline silica pigment-T (pH 8.5–9.5) | 150 | 150 | 150 | 150 |
| | | Dry solids basis | 15 | 15 | 15 | 15 |
| | | Water | 50 | 50 | 50 | 5 |
| | | 2% Zinc sulfate | — | 45 | — | — | 
| | | 2% Sulfuric acid | — | — | 25.5 | — | — |
| | | 2% Calcium-chloride | — | — | — | — | 39 |
| | | Silica slurry pH | 5.0 | 6.5 | 7.0 | 8.5 | 7.5 |
| | (c) | Treated Silica Pigment Filtered (X) | X | X | X | X | X |
| | | Filter cake | 128 | 132 | 134 | 154 | 121 |
| | (d) | Oleophilic Amine Material | | | | | |
| | | Armeen T[2] | 0.8 | 1.5 | — | — | — |
| | | Duomeen T[3] | — | — | 0.9 | 1.5 | 1.0 |
| | | Benzene | 40 | 40 | 40 | 40 | 40 |
| | (e) | Blending (c) and (d) blender[4], min. | 0.5 | 0.5 | 0.5 | 0.5 | 0.5 |
| (B) Polymer Solution | | | | | | |
| | (a) | Polymer Isobutylene-isoprene[5] | 30 | — | — | — | — |
| | | Butadiene styrene[6] | — | 30 | — | — | |
| | | Ethylene-propylene terpolymer[7] | — | — | 30 | 30 | — |
| | (b) | Solvent Hexane | 132 | 170 | 270 | 132 | 132 |
| | | Antioxidant[8] | 0.6 | 0.6 | 0.6 | 0.6 | 0.6 |
| | (c) | Solvation Conditions | | | | | |
| | | Temp. °C. | 60 | 60 | 60 | 60 | 60 |
| | | Time agitated, hrs. | 12 | 12 | 12 | 12 | 12 |
| (C) Blending (A) plus (B) Blender,[4] min. | | | 0.5 | 0.5 | 0.5 | 0.5 | 0.5 |
| (D) Solvent Removal[9] Boiling water (x) | | | X | X | X | X | X |
| Silica separation into water phase | | | none | none | none | none | none |
| (E) Masterbatch Dried (105°C.) (X) | | | X | X | X | X | X |

(1) Aluminum sulfate $Al_2(SO_4)_3 \cdot 14H_2O$.
(2) Armeen T (a trademark product) tallow amine.
(3) Duomeen T (a trademark product) N-tallow trimethylene diamine.
(4) Waring blender (a trademark product).
(5) Butyl rubber 268, (a trademark product).
(6) Solprene 300, (a trademark product) a normal viscosity, non-staining, solution polymerized random 75/25 copolymer of butadiene and styrene.
(7) Nordel 1320, (a trademark product) a terpolymer of ethylene, propylene and a non-conjugated diene.
(8) The antioxidant is 2,2-methylene-bis(4-methyl-6-t.-butylphenol)
(9) The silica-solvated polymer combination is dropped into boiling water to vaporize the solvent and the polymer-silica masterbatch is recovered and dried.

TABLE V

Silica-Polymer Masterbatch (Parts by wt.)

| Example | | | 10 | 11 | 12 | 13 |
|---|---|---|---|---|---|---|
| (A) Silica Pigment Slurry Treated Oleophilic Amine Material | | | | | | |
| | (a) | Silica Pigment Aqueous Slurry Alkaline silica pigment-I (pH = 8.5–9.5) | 150 | 150 | 150 | 150 |
| | | Dry solids basis | 15 | 15 | 15 | 15 |
| | | Water | 50 | 50 | 50 | 50 |
| | (b) | Reagent Aqueous Solution | | | | |
| | | 2% Calcium chloride | 35 | — | — | — |
| | | 2% Barium chloride | — | 60 | — | — |
| | | 2% Magnesium sulfate | — | — | 35 | — |
| | | 2% Ammonium alum | — | — | — | 85 |
| | | Silica slurry pH | 8.0 | 8.6 | 8.6 | 5.0 |
| | (c) | Treated Silica Pigment | | | | |
| | (b) | Reagent-Aqueous Solution | | | | |
| | | 2% Aluminum sulfate[1] | 55 | — | — | 28 |
| | | 2% Sulfuric acid | — | 25.5 | 25.5 | 13 |
| | | Silica slurry pH | 5.0 | 7.0 | 7.0 | 4.0 |
| | (d) | Treated Silica Pigment Filtered (X) | X | X | X | X |
| | | Filter cake | 120 | 134 | 134 | 128 |
| | (d) | Oleophilic Amine Material | | | | |
| | | Ethomeen T-25[2] | 1.0 | — | — | — |
| | | Rosin amine[3] | — | 3.0 | — | — |
| | | Armeen 2HT[4] | — | — | 1.0 | — |
| | | 10% Armeen 2C[5] | — | — | — | 1.0 |
| | | Benzene | 3.0 | 3.0 | 0.7 | 3.0 |
| (A) Polymer Solution | | | | | | |
| | (a) | Copolymer Butadiene-styrene[5]* | 30 | — | — | — |
| | | Ethylene-propylene terpolymer[6]* | — | 25 | — | — |
| | | Isobutylene-isoprene[7] | — | — | 30 | 30 |
| | (b) | Solvent | | | | |
| | | Hexane | 270 | 200 | 152 | — |
| | | Toluene | — | — | — | 152 |
| | | Antioxidant[8] | 0.6 | 0.6 | 0.6 | 0.6 |
| | (c) | Solvation Conditions | | | | |
| | | Temp., °C. | 70 | 70 | 70 | 70 |
| | | Time agitated, hrs. | 12 | 12 | 12 | 12 |
| | | *Milled. | | | | |
| (B) Blending (A) plus (B) Blender[9], min. | | | 0.5 | 0.5 | 0.5 | 0.5 |
| (C) Solvent Removal[10] Boiling water (X) | | | X | X | X | X |
| Silica separation into water phase | | | none | none | none | none |
| (D) Masterbatch Dried (105°C.) (X) | | | X | X | X | X |

(1) Aluminum sulfate $Al_2(SO_4)_3 \cdot 14H_2O$.
(2) Ethoduomeen T-25, (a trademark product) polyoxyethylene tallow triethylenediamine (2 moles of ethylene oxide).*
(3) Rosin amine D (a trademark product).
(4) Di-hydrogenated tallow-amine.
(5) Armeen 2C (a trademark product) dicoco amine.
* Excessive amounts of ethylene oxide in the amine can cause separation of silica when the masterbatch is added to hot water.
(5) Solprene 300, (a trademark product) a normal viscosity, non-staining, solution polymerized random 75/25 copolymer of butadiene and styrene.
(6) Nordel 1320 (a trademark product) a terpolymer of ethylene, propylene and a non-conjugated diene.
(7) Butyl rubber 268 (a trademark product).
(8) The antioxidant is 2,2'-methylene-bis(4-methyl-6-t.-butylphenol).
(9) Waring Blender, (a trademark product).
(10) The silica-solvated polymer masterbatch is dropped into boiling water to vaporize the solvent and the silica-polymer masterbatch is recovered and dried.

|   | | | | | |
|---|---|---|---|---|---|
| | Filtered (X) | X | X | X | X |
| | Filter Cake | 121 | 120 | 120 | 119 |
| (d) | Oleophilic Amine Material | | | | |
| | Armeen T[1] | 0.8 | — | — | — |
| | Duomeen T[2] | — | 1.5 | 1.1 | 1.5 |
| | Benzene | 40 | 30 | 20 | 30 |
| (e) | Blending (c) and (d) | | | | |
| | Blender[3], Min. | 0.5 | 0.5 | 0.5 | 0.5 |
| (B) Polymer Solution | | | | | |
| (a) | Polymer Isobutylene-isoprene[4] | 30 | 30 | 30 | 30 |
| (b) | Solvent and Antioxidant | | | | |
| | Hexane | 132 | 132 | 132 | 132 |
| | Antioxidant[5] | 0.6 | 0.6 | 0.6 | 0.6 |
| (c) | Solvation Conditions | | | | |
| | Temp. °C. | 60 | 60 | 60 | 60 |
| | Time agitated, hrs. | 12 | 12 | 12 | 12 |
| (C) Combine (A) and (B) | | | | | |
| | Blend[3], Min. | 0.5 | 0.5 | 0.5 | 0.5 |
| (D) Solvent Removal[6] | | | | | |
| | Boiling Water (X) | X | X | X | X |
| | Silica separation into serum | none | none | none | none |
| (E) Masterbatch | | | | | |
| | Dried (105°C.) (X) | X | X | X | X |

(1) Armeen T (a trademark product) tallow amine.
(2) Duomeen T (a trademark product) N-tallow trimethylene diamine.
(3) Waring blender (a trademark product).
(4) Butyl rubber (a trademark product).
(5) The antioxidant is 2,2'-methylene-bis/4-methyl-6-t.-butyl phenol).
(6) The treated silica-solvated polymer combination is dropped into boiling water to vaporize the solvent and the polymer-silica masterbatch is recovered and dried.

TABLE VI

Silica-Polymer Masterbatch (Parts by wt.)

| Example | 14 | 15 | 16 |
|---|---|---|---|
| (A) Silica Pigment Slurry | | | |
| Alkaline silica pigment-I pH = 8.5–9.5 | 37 | 37 | 37 |
| Dry solids basis | 5 | 5 | 5 |
| (B) Oleophilic Amine Material | | | |
| 10% Ethoduomeen T-25[1] | 1 | — | — |
| 10% Armeen DMCD[2] | — | 1 | — |
| 10% Armeen 2C[3] | — | — | 1 |
| 5.6% Aqueous ammonia | — | 2 | 2 |
| (C) Combine (A) and (B) | | | |
| Blend[4], Min. | 0.5 | 0.5 | 0.5 |
| (D) Polymer Solution | | | |
| 18.2% Isobutylene-isoprene copolymer in hexane[5] | 55 | 55 | 55 |
| Dry solids basis | 10 | 10 | 10 |
| Antioxidant[6] | 0.2 | 0.2 | 0.2 |
| (E) Combine (C) and (D) | | | |
| Blend[4], Min. | 0.5 | 0.5 | 0.5 |
| (F) Solvent Removal[7] | | | |
| Boiling water (X) | X | X | X |
| Silica separation in serum | none | none | none |
| (G) Masterbatch | | | |
| Dried (105°C.) (X) | X | X | X |

(1) A trademark product, polyoxyethylene tallow triethylene diamine (2 moles of ethylene oxide) in isopropanol.
(2) A trademark product, coco dimethyl amine in benzene.
(3) A trademark product, dicoco amine in benzene.
(4) Waring blender, a trademark product.
(5) Butyl rubber 268, a trademark product.
(6) Antioxidant is 2,2'-methylene-bis(4-methyl-6-t.-butyl phenol.)
(7) The silica-solvated polymer combination is dropped into boiling water to vaporize the solvent and the silica-polymer masterbatch is recovered and dried.

TABLE VII

Silica-Polymer Masterbatch (Parts by wt.)

| Example | 17 | 18 | 19 |
|---|---|---|---|
| (A) Silica Pigment Slurry | | | |
| Alkaline silica pigment-I pH = 8.5–9.5 | 37 | 37 | 37 |
| Dry solids basis | 5 | 5 | 5 |
| (B) Oleophilic Amine Material | | | |
| 10% Armeen T[1] | 1 | 1 | 1 |
| 5.6% Aqueous ammonia | 2 | 2 | 2 |
| (C) Combine (A) and (B) | | | |
| Blend[2], Min. | 0.5 | 0.5 | 0.5 |
| (D) Polymer Solution | | | |
| 18.2% Isobutylene-isoprene copolymer in hexane[3] | 55 | — | — |
| 10% butadiene-styrene-copolymer in hexane[4] | — | 100 | — |
| 10% Ethylene-propylen terpolymer in hexane[5] | — | — | 100 |
| Dry solids basis | 10 | 10 | 10 |
| Benzene | 20 | 20 | 20 |
| Antioxidant[6] | 0.2 | 0.2 | 0.2 |
| (E) Blend (C) and (D) | | | |
| Blend[2], Min. | 0.5 | 0.5 | 0.5 |
| (F) Solvent Removal[7] | X | Boiling Water(X) | X |
| Silica separation in serum | none | none | none |
| (G) Masterbatch | | | |
| Dried (105°C.) (X) | X | X | X |

(1) A trademark product, tallow amine in benzene.
(2) Waring blender, a trademark product.
(3) Butyl rubber 268, a trademark product.
(4) Solprene 300, (a trademark product) a normal viscosity, non-staining, solution polymerized random 75/25 copolymer of butadiene and styrene.
(5) Nordel 1320, (a trademark product) a terpolymer of ethylene, propylene and a non-conjugated diene.
(6) The antioxidant is 2,2'-methylene-bis(4-methyl-6-t.-butyl phenol).
(7) The silica-solvated polymer combination is dropped into boiling water to vaporize the solvent and the silica-polymer masterbatch is recovered and dried.

Examples 20–28

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer solvent cement and silica pigment slurry prior to the coagulation thereof by solvent removal. Such combinations may be effected in any suitable way, e.g., the carbon black may be added as an aqueous slurry and the processing oil as an aqueous dispersion preferably with an anionic emulsifying agent and/or ammonium hydroxide. The carbon black may be any commercial carbon black suitable for rubber compounding, e.g., the trademarked blacks; Philblack O, Statex K, Thermax, Kosmobile 77, or the like, and may be slurried with the aid of an anionic dispersing agent; and the processing oil may be any of the processing oils suitable for use in rubber compounding, e.g., petroleum oils of the naphthenic, aromatic, and highly aromatic categories, which are commercially available under trademark designations, such as Circosol 2XH, Sundex 53, Shell SPX97, Dutrex 20, and Califlux TT, and other oils suitable for rubber compounding or the oil-extension of synthetic rubber, among which are the predominantly aromatic Sundex (TM) and Shell Dutrex (TM) oils, and the predominantly paraffinic or naphthenic Sunpar (TM), Sunthene (TM), Circosol (TM), and Shellflux (TM) oils, and the like.

In preferred embodiments of this invention, the oleophilic amine treated wet silica pigment being in a slurry form, the carbon black and/or processing oil may be added directly to the said slurry without any prior aqueous dispersment, and with the aid of a high shear mixer, e.g., a Waring Blender, a uniform dispersion of the combination is readily obtained.

The following examples 20–28 are illustrative of such modes of practicing the invention.

TABLE VIII

Silica-Polymer Masterbatch

Including Processing Oil and/or Carbon Black (Parts by wt.)

| Example | | | 20 | 21 | 22 | 23 |
|---|---|---|---|---|---|---|
| (A) Silica Pigment - Oleophilic Amine Material | | | | | | |
| | (a) | Silica Pigment Slurry Alkaline silica pigment-I (pH 8.5) | 200 | 200 | 200 | 200 |
| | | Dry solids basis | 20 | 20 | 20 | 15 |
| | | Water | 50 | 50 | 50 | 50 |
| | (b) | Reagent-Aqueous Solution | | | | |
| | | 10% sulfuric acid | 6.8 | 6.8 | 6.8 | 5.1 |
| | | Silica slurry, pH* | 7 | 7 | 7 | 7 |
| | | *Filter cake after washing. | | | | |
| | (c) | Oleophilic Amine Material | | | | |
| | | Armeen C[1] | 1.33 | 1.33 | — | — |
| | | Armeen T[2] | — | — | 1.4 | 1.1 |
| | | Benzene | 4 | 4 | 4.2 | 3.3 |
| | | Combine (A) and (B) and (C), (X) | X | X | X | X |
| | (d) | Treated Silica Pigment Filtered (X) | X | X | X | X |
| (B) Carbon Black-Processing Oil | | | | | | |
| | (a) | Carbon Black | | | | |
| | | Carbon black[3] | — | 45 | 45 | 40 |
| | | Hydroxyacetic acid | — | 0.4 | — | — |
| | | 28% Aqueous ammonia | — | — | 1.0 | 1.0 |
| | | Water | — | 200 | 200 | 200 |
| | | Blender high shear (X) | X | X | X | X |
| | (b) | Processing Oil | | | | |
| | | Processing oil[4] | 7 | 7 | 20 | — |
| | | Stearyl amine | — | 1 | — | — |
| | | Oleic acid | — | — | 1 | — |
| | (c) | Combine (a) and (b) and homogenize (X) | X | X | X | X |
| (C) Polymer Solution | | | | | | |
| | (a) | Copolymer | | | | |
| | | Butadiene-styrene[5]* | 33 | — | — | — |
| | | Butadiene-styrene[6]* | — | 100 | — | — |
| | | Ethylene-propylene terpolymer[7] | — | — | 100 | — |
| | | Isobutylene-isoprene[8] | — | — | — | 100 |
| | | *Milled. | | | | |
| | (b) | Solvent | | | | |
| | | Hexane | 297 | 400 | — | 440 |
| | | Benzene | — | 200 | 900 | — |
| | | Antioxidant[9] | 0.7 | 2 | 2 | 2 |
| | (c) | Solvation Conditions | | | | |
| | | Temp., °C. | 70 | 70 | 70 | 70 |
| | | Time agitated, hrs. | 12 | 12 | 12 | 12 |
| (D) Blending (A) plus (B) plus (C) Blend[10], min. | | | 0.5 | 0.5 | 0.5 | 0.5 |
| (E) Solvent Removal[11] | | | | | | |
| | | Boiling water (X) | X | X | X | X |
| | | Silica separation into water phase | none | none | none | none |
| (F) Masterbatch | | | | | | |
| | | Dried (105°C.) (X) | X | X | X | X |

(1) Armeen C (a trademark product) coco amine.
(2) Armeen T (a trademark product) tallow amine.
(3) Statex K (a trademark product).
(4) Sundex 2XH (a trademark product).
(5) Solprene 300 (a trademark product) a normal viscosity, non-staining, solution polymerized random 75/25 copolymer of butadiene and styrene.
(6) Solprene 1206 (a trademark product) same as (1) except of low viscosity.
(7) Nordel 1320 (a trademark product) a normal viscosity, non-staining, solution polymerized random 75/25 copolymer of butadiene and styrene.
(8) Butyl rubber 268 (a trademark product).
(9) The antioxidant is 2,2'-methylene-bis(4-methyl-t-t.-butyl phenol).
(10) Waring blender (a trademark product).
(11) The silica-solvated polymer combination is dropped into boiling water to vaporize the solvent and the silica-carbon black-polymer masterbatch is recovered and dried.

TABLE IX

Silica-Polymer Masterbatch

Including Carbon Black (Parts by wt.)

| Example | 24 | 25 | 26 | 27 | 28 |
|---|---|---|---|---|---|
| (A) Silica Pigment Slurry Alkaline silica pigment-I pH=8.5–9.5 | 25 | 25 | 25 | 25 | 25 |
| dry solids basis | 2.5 | 2.5 | 2.5 | 2.5 | 2.5 |
| (B) Reagent-Aqueous Solution | | | | | |
| 2% Aluminum sulfate[1] | 8.5 | — | — | — | — |
| 2% Calcium chloride | — | 5.0 | — | — | — |
| 2% zinc sulfate | — | — | 6.8 | — | — |
| 2% Magnesium sulfate | — | — | — | 5.0 | — |
| 2% Sulfuric acid | — | — | — | — | 4.5 |
| (C) Combine (A) and (B) Blend[2], min. | 0.5 | 0.5 | 0.5 | 0.5 | 0.5 |
| (D) Oleophilic Amine Material | | | | | |
| 20% Stearylamine* | 1.0 | — | — | — | — |
| 20% Cocoamine* | — | 0.5 | — | — | — |
| 20% Di-cocoamine* | — | — | 0.5 | — | — |
| 20% Rosin amine* | — | — | — | 0.5 | 0.5 |
| (E) Combine (C) and (D) Blend[2], min. | 0.5 | 0.5 | 0.5 | 0.5 | 0.5 |
| (F) Carbon Black Philblack O[3] | 5 | 5 | 5 | 5 | 5 |
| (G) Combine (E) and (F) Blend[2], min. | 0.5 | 0.5 | 0.5 | 0.5 | 0.5 |
| (H) Polymer Solution | | | | | |
| 18.2% Isobutylene-isoprene copolymer in hexane (4) | 55 | — | — | — | — |
| 10% Butadiene-styrene copolymer in hexane (5) | — | — | 100 | 100 | — |
| 10% Ethylene-propylene terpolymer in hexane (6) | — | — | — | — | 100 |

| | | | | | |
|---|---|---|---|---|---|
| Dry solids basis | 10 | 10 | 10 | 10 | 10 |
| Antioxidant[7] | 0.2 | 0.2 | 0.2 | 0.2 | 0.2 |
| (I) Combine (G) and (H) Blend[2], min. | 0.5 | 0.5 | 0.5 | 0.5 | 0.5 |
| (J) Solvent Removal[8] Boiling water (x) | X | X | X | X | X |
| Silica separation in serum | none | none | none | none | none |
| (K) Masterbatch Dried (105°C.) (X) | X | X | X | X | X |

(1) Aluminum sulfate $Al_2(SO_4)_3 \cdot 14H_2O$.
(2) Waring blender, a trademark product.
(3) A trademark product.
(4) Butyl rubber 268, (a trade mark product).
(5) Solprene 300, (a trademark product) a normal viscosity, non-staining, solution polymerized random 75/25 copolymer of butadiene and styrene.
(6) Nordel 1320, (a trademark product) a termpolymer of ethylene, propylene and a non-conjugated diene.
(7) The antioxidant is 2,2-methylene-bis(4-methyl-6-t.-butylphenol).
(8) The silica-solvated polymer combination is dropped into boiling water to vaporize the solvent and the silica-carbon black-polymer masterbatch is recovered and dried.

The masterbatches prepared in accordance with the present invention may be compounded with vulcanizing ingredients and vulcanized by any suitable recipe (e.g., the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatibility of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the copending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
    a. aqueously wet hydrated silica pigment, and
    b. an elastomer;
which process comprises the steps of:
    c. providing an organic solvent dispersion of the elastomer containing (1) 100 parts of an elastomer by weight, and (2) the solvent of which is essentially water immiscible,
    d. providing an aqueous slurry containing 5 to 75 parts by weight, dry basis, of hydrated silica pigment precipitate which has a bound alkali content in the range of 0.1 to 10 percent by weight as $Na_2O$; which has been prepared by precipitation from an aqueous solution of alkali-metal silicate with the aid of carbon dioxide; which has been filtered and washed; and which has continuously been maintained in an aqueously wet state without having been dried after its precipitation;
    e. providing a quantity of from 0.1 to 20 percent by weight, based on the silica pigment referred to in step (d), of oleophilic amine material selected from the group consisting of free amines and amine salts of mineral acids;
    f. combining the aqueous silica pigment slurry provided by step (d) with the oleophilic amine material provided by step (e), and from 0 to at least a stoichiometric equivalent, based on the alkalinity of the silica pigment slurry, of reactant selected from the class consisting of the members of the following groups: Group (I) the water soluble salts of aluminum of zinc; Group (II) the water soluble salts of alkaline earth metals; Group (III) the mineral acids; and Group (IV) combinations of any two or more of such members, thereby to produce a treated silica pigment slurry;
    g. then intimately mixing the solvent dispersion of elastomer provided by step (c), together with (1) the treated silica pigment slurry prepared by step (f), (2) from 0 to 65 parts by weight of carbon black and (3) from 0 to 45 parts by weight of processing oil, with the limitations that the total of silica pigment and carbon black, dry basis, not exceed 80 parts by weight, and that the total of carbon black and processing oil, by weight, be at least 5 percent of the weight of silica pigment, dry basis, when the reactant employed in step (f) is selected essentially from Group (II); and
    h. separating the volatiles from the resulting masterbatch.

2. A process as defined in claim 1, in which the solvent employed in step (c) itself, or as an aqueous azeotrope has a boiling point lower than that of water at atmospheric pressure, and in which step (h) is effected by volatilizing solvent from the intimate mixture to convert said mixture to coagulum and aqueous serum, and then separating the coagulum from the serum as a masterbatch.

3. A process as claimed in claim 1, wherein the reactant is employed in step (f) in about said stoichiometric amount.

4. A process as claimed in claim 1, in which the elastomer consists essentially of polymer prepared by essentially anhydrous polymerization.

5. A process as claimed in claim 1, in which at least 5 parts by weight of carbon black is employed in step (g).

6. A process as claimed in claim 1, in which at least 5 parts by weight of processing oil is employed in step (g).

* * * * *